(12) United States Patent
Kension et al.

(10) Patent No.: US 7,424,176 B2
(45) Date of Patent: Sep. 9, 2008

(54) OPTICAL FIBER TERMINATION APPARATUS AND METHODS OF USE, AND OPTICAL FIBER TERMINATION PROCESS

(75) Inventors: Michael Kension, Missouri City, TX (US); Michael G. Gay, Dickinson, TX (US); Robert Bucher, Houston, TX (US); Mahmuda Afroz, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 13 days.

(21) Appl. No.: 11/312,848

(22) Filed: Dec. 20, 2005

(65) Prior Publication Data
US 2007/0140622 A1 Jun. 21, 2007

(51) Int. Cl.
G02B 6/00 (2006.01)
G02B 6/38 (2006.01)
G01V 3/00 (2006.01)
(52) U.S. Cl. ............... 385/12; 385/76; 385/77; 385/78; 385/86; 385/100; 385/134; 385/147; 340/853.1; 340/854.3; 340/854.4; 340/854.5; 340/854.6; 340/854.7
(58) Field of Classification Search .............. 340/854.7; 385/12
See application file for complete search history.

(56) References Cited

U.S. PATENT DOCUMENTS

| 2,558,427 | A |   | 6/1951 | Fagan |   |
|---|---|---|---|---|---|
| 4,652,274 | A |   | 3/1987 | Boettcher |   |
| 4,735,632 | A |   | 4/1988 | Oxman |   |
| 4,751,138 | A | * | 6/1988 | Tumey et al. | ............... 428/323 |
| 4,859,054 | A |   | 8/1989 | Harrison |   |
| 4,903,440 | A |   | 2/1990 | Kirk |   |
| 4,985,340 | A |   | 1/1991 | Palazzotto |   |
| 5,236,472 | A |   | 8/1993 | Kirk |   |
| 5,275,038 | A | * | 1/1994 | Sizer et al. | ............... 73/152.02 |
| 5,434,395 | A |   | 7/1995 | Storck et al. |   |
| 5,485,745 | A | * | 1/1996 | Rademaker et al. | ...... 73/152.39 |

(Continued)

FOREIGN PATENT DOCUMENTS

DE 2818656 10/1979

(Continued)

OTHER PUBLICATIONS

Fiber Optic Fluorosensor for Oxygen and Carbon Dioxide, Anal. Chem. 60, 2028-2030 (1998) by O.S. Wolfbeis, L. Weis, M.J.P. Leiner and W.E. Ziegler.

(Continued)

*Primary Examiner*—Frank G Font
*Assistant Examiner*—Ryan Lepisto
(74) *Attorney, Agent, or Firm*—Rodney Warfford; David Cate; Robin Nava

(57) ABSTRACT

Apparatus and methods for terminating and anchoring fiber optic connections are disclosed. One apparatus includes a sealed body enclosing a passage for one or more optical fibers terminating in connections proximate a first end of the sealed body, the sealed body having a diameter less than an internal diameter of an oilfield tubular, the sealed body having a second end adapted to sealingly engage and anchor an end of a fiber optic carrier conduit, the second end connecting the sealed body to the fiber optic carrier conduit.

11 Claims, 7 Drawing Sheets

U.S. PATENT DOCUMENTS

| | | | |
|---|---|---|---|
| 5,542,471 A | 8/1996 | Dickinson | |
| 5,573,225 A | 11/1996 | Boyle et al. | |
| 6,041,872 A * | 3/2000 | Holcomb | 175/40 |
| 6,349,768 B1 | 2/2002 | Leising | |
| 6,419,014 B1 | 7/2002 | Meek et al. | |
| 6,474,152 B1 | 11/2002 | Mullins et al. | |
| 6,519,568 B1 | 2/2003 | Harvey et al. | |
| 6,667,280 B2 | 12/2003 | Chang et al. | |
| 2004/0084190 A1 | 5/2004 | Hill et al. | |
| 2004/0129418 A1 | 7/2004 | Jee et al. | |
| 2005/0126777 A1 | 6/2005 | Rolovic et al. | |
| 2006/0044156 A1 | 3/2006 | Adnan et al. | |

FOREIGN PATENT DOCUMENTS

| | | |
|---|---|---|
| DE | 29816469 | 2/1999 |
| EP | 109581 A2 | 5/1984 |
| EP | 0203249 | 12/1986 |
| EP | 0306161 A2 | 3/1989 |
| EP | 0306162 B1 | 3/1989 |
| EP | 0853249 | 7/1998 |
| GB | 2177231 | 1/1987 |
| GB | 2299868 | 10/1996 |

OTHER PUBLICATIONS

Journal of testing and evaluation, vol. 21, Issue 5 in Sep. 1993 by M. H. Maher and M.R.Shahriari.

Measurement of the Degree of Salinity of Water with a Fiber-Optic Sensor, Applied Optics, vol. 38, Issue 25, 5267-5271, Sep. 1999 by O. Esteban, M. Cruz-Navarrete, N. lez-Cano and E. Bernabeu.

* cited by examiner

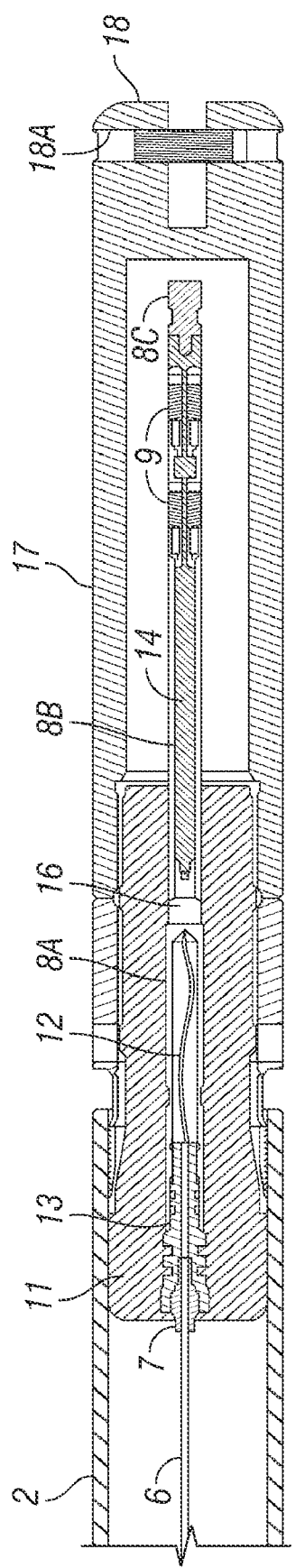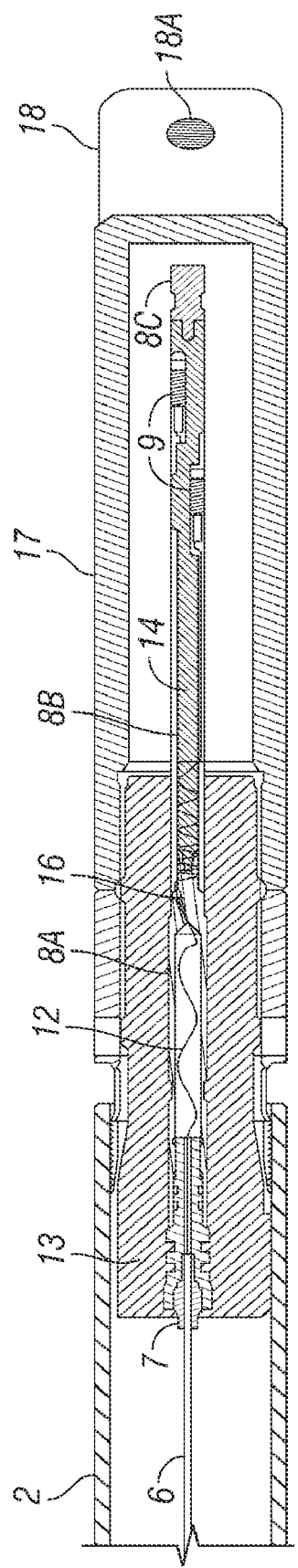

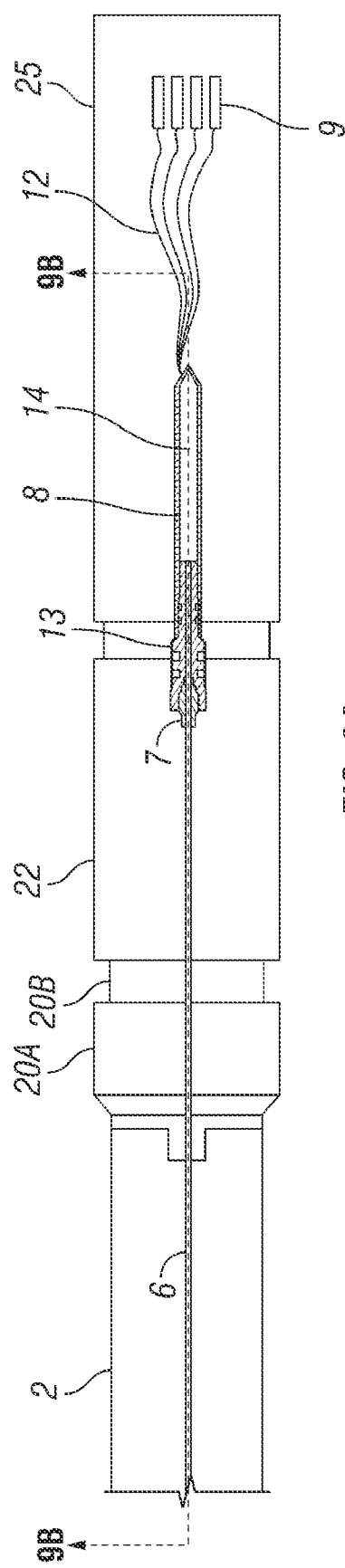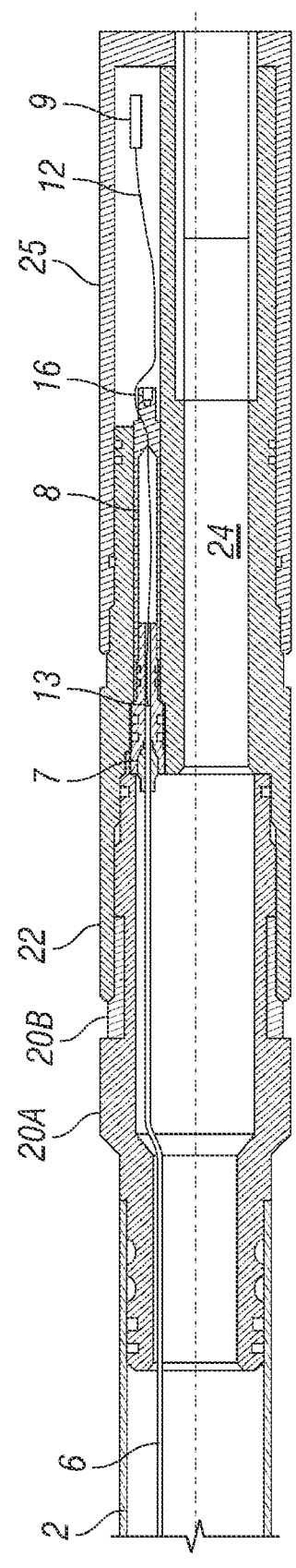
FIG. 9A
FIG. 9B

OPTICAL FIBER TERMINATION APPARATUS AND METHODS OF USE, AND OPTICAL FIBER TERMINATION PROCESS

BACKGROUND OF THE INVENTION

1. Field of Invention

The present invention relates generally to the fields of hydrocarbon exploration and production, and more specifically to use of optical fibers in such fields.

2. Related Art

Optical fibers are used during a number of operations in a subterranean wellbore. For example, optical fibers may be deployed downhole through coiled tubing, threaded pipe strings, and through the annulus between a coiled tubing or pipe string and a wellbore. For example, a fiber optic tether may be deployed into a coiled tubing string, the coiled tubing deployed into a wellbore, and one or more optical fibers used to transmit control signals from a surface control system over the fiber optic tether to borehole equipment connected to the coiled tubing. Another use might be to transmit information from borehole equipment to the surface control system over the fiber optic tether. Yet another use might be to transmit a property measured by the fiber optic tether to the surface control system via the fiber optic tether. In some instances the fiber optic tether may be used in performing an operation downhole, where the operation is controlled by signals transmitted over the fiber optic tether. Such operations may include for example activating valves, setting tools, activating firing heads or perforating guns, activating tools, and reversing valves.

In fiber optic-enabled coiled tubing operations, a fiber optic-enabled coiled tubing string comprises one or more fiber optic cables carried in a protective tube from one end of the coiled tubing to the other. In these situations both ends of the fiber have to have connectors or terminations made on them so that they can be connected to sensors or electronics. In particular the connectors/terminations must be made so that wellbore and treatment fluid is not allowed into the protective tube carrier as it might not be compatible with the fiber. Once the fiber optic terminations have been made to the fiber the termination must be protected on both the surface end and the down hole end from the pressures and temperatures. Three common methods for attaching the downhole end of the tether to the end of coiled tubing are an external dimple connector, an external slip connector, and an internal roll-on connector. In the first two cases the outside diameter of the connector is larger than the coiled tubing outside diameter and may not fit through the coiled tubing injector head. One possible consequence of this is that, in an offshore application or a land application, when the coiled tubing must be stabbed into the injector head on location, or at the rig, the fiber optic termination would have to be made on location. In the third situation a substantial pumping restriction may be incurred.

It would be an advance in the art to eliminate the user having to make a fiber optic termination on location, particularly in situations where the coiled tubing must be stabbed in the injector head while on location. It would further be an advance in the art to reduce the time to ready the coiled tubing unit on location for an optical fiber-enabled coiled tubing operation. A fiber optic termination process that is repeatable, that does not require bulky equipment typically associated with the making of fiber optic terminations, and is suitable for use in the oilfield, and in particular for use in coiled tubing operations, would be advantageous. Finally, it would be advantageous if these goals could be met while also making sure that the maximum pumping capacity is achieved by allowing the bottom hole assembly inside diameter to be maximized through, coiled tubing connector selection.

SUMMARY OF THE INVENTION

In accordance with the present invention, apparatus and methods are described that reduce or overcome problems in previously known apparatus and methods. Apparatus and methods of the invention allow the user to make up fiber optic terminations in the yard, stab an oilfield tubular (pipe, coiled tubing, and the like) through an injector head or other oilfield equipment on location, and attach a fiber optic-enabled tool without the need to make fiber optic terminations on location. Apparatus and methods of the invention may also allow the user to select the connection type to oilfield tubular after the tubular has been placed in the injector head.

A first aspect of the invention are apparatus comprising:
(a) a sealed body enclosing a passage for one or more optical fibers terminating in a fiber optic termination proximate a first end of the sealed body;
(b) the sealed body having a diameter less than an internal diameter of an oilfield tubular, the sealed body having a second end adapted to sealingly engage and anchor an end of a fiber optic carrier conduit.

Apparatus of the invention may be in the form of an elongate tube or cartridge, and capable of fitting within a removable enclosure, termed herein a stabbing connection. A stabbing connection allows a coiled tubing to be fed through oilfield equipment, such as a coiled tubing feeder apparatus (also referred to as an injector), without damaging the optical fiber and optical fiber terminations. The second end of the sealed body may comprise any connection type, such as dimple, slip, roll-on, and equivalent connection. Apparatus of the invention may also comprise a bare fiber optic bulkhead to protect the optical fiber from wellbore and treatment fluids that may try to enter the bottom hole assembly and the fiber optic carrier. In certain embodiments the bare fiber optic bulkhead could also allow the apparatus of the invention to be used in a hard wired disconnect. The sealed body and first and second ends may be acid and organic and inorganic solvent compatible in some embodiments, and may be constructed to survive moderate solids, for example 1-2 ppa sand or higher. Apparatus of the invention may include an internal concentric or other positioned rod on which excess optical fiber slack may be wrapped and stored inside the sealed body during stabbing and un-stabbing. Apparatus of the invention may be constructed so that the fiber optic carrier conduit may disconnect from the apparatus when a predetermined tensile stress is applied to the anchoring connection. The apparatus may connect to a separate disconnect component, which offers protection to the optical fibers housed inside the optical fiber carrier from wellbore and treatment fluids when a bottom hole assembly or other fiber optic-enabled tool is disconnected from the disconnect component. In certain embodiments the disconnect component may be operable by one of the optical fibers inside the optical fiber carrier.

Another aspect of the invention are methods of using the apparatus of the invention in coiled tubing operations, one method of the invention comprising:
(a) preparing an apparatus of the invention remote from a use site;
(b) sealingly engaging an end of a fiber optic carrier conduit to the second end of the apparatus;
(c) installing a stabbing head over the apparatus forming a temporarily covered apparatus; and (d) stabbing the covered apparatus through an oilfield component, such as a coiled tubing injector head.

Methods of the invention include those wherein the stabbing head is removed to expose an apparatus of the invention, and methods wherein the first end of the apparatus is connected to a fiber optic-enabled tool or bottom hole assembly. When the optical fiber-enabled tool is withdrawn from a wellbore, a bottom hole assembly or other optical fiber-enabled tool may be disconnected when it reaches the surface, the stabbing head re-installed over the apparatus, and the coiled tubing withdrawn through the injector head.

Another aspect of the invention are methods applicable when a fiber optic termination is required in a matter of a few minutes, either in the yard or on location at a user site, one method comprising:
  (a) installing an assembly fixture on an oilfield tubular, the assembly fixture including means for holding a fiber optic ferrule;
  (b) inserting a fiber optic ferrule into the means for holding;
  (c) partially filling the ferrule with a radiation curable resin;
  (d) inserting an optical fiber portion into the ferrule; and
  (e) exposing the radiation curable resin to radiation sufficient to cure the resin.

Methods of this aspect of the invention include those wherein a portion of the optical fiber is exposed on the other side of the ferrule, radiation curable resin is applied to the portion exposed on the other side, and exposing the radiation curable resin to radiation sufficient to cure the resin. Other methods include filling the ferrule with radiation curable resin and exposing to radiation sufficient to cure the resin, cleaving the optical fiber, and exposing the ferrule to radiation sufficient to cure any remaining uncured resin. Polishing the fiber may then be performed, either by hand or by machine.

Apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIGS. 8A and 8B are cross-sectional views of the apparatus of FIG. 7 having an installed stabbing head;

FIGS. 9A and 9B are cross-sectional views of the apparatus of FIG. 7 installed in a coiled tubing head;

Figure 1:
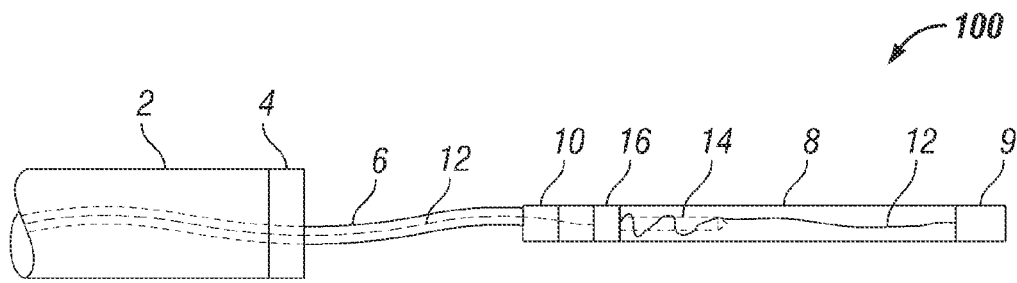
FIG. 1 is a schematic cross-sectional view of an apparatus in accordance with the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes apparatus useful for protecting optical fibers and fiber optic terminations, and methods of using same, and methods of making optical fiber terminations. As used herein the term "termination" is used as a noun unless otherwise noted, and means a terminus of an optical fiber transformed into a connection enabling communication between two elements. The communication may be with either another optical component or with an electronic component; in the latter case, an optical/electronic converter may be used. One of the two elements communicating over the optical fiber may be located at a surface or other remote location, and the other element may be in a wellbore. A "wellbore" may be any type of well, including, but not limited to, a producing well, a non-producing well, an experimental well, an exploratory well, and the like. Wellbores may be vertical, horizontal, some angle between vertical and horizontal, and combinations thereof, for example a vertical well with a non-vertical component. During a conventional fiber optic-enabled coiled tubing operation, a fiber optic-enabled coiled tubing string comprises one or more fiber optic cables carried in a protective tube from one end of the coiled tubing to the other. In these situations both ends of the fiber have to have terminations made on them so that they can be connected to sensors or electronics. In particular fiber optic terminations must be made so that wellbore and treatment fluid is not allowed into the protective tube carrier as it might not be compatible with the fiber. Once the fiber optic terminations have been made to the fiber the termination must be protected on both the surface end and the down hole end from the pressures and temperatures. Three common methods for attaching the downhole end of the tether to the end of coiled tubing are an external dimple connector, an external slip connector, and an internal roll-on connector. In the first two cases the outside diameter of the connector is larger than the coiled tubing outside diameter and may not fit through the coiled tubing injector head. One possible consequence of this is that, in an offshore application or a land application, when the coiled tubing must be stabbed into the injector head on location, or at the rig, the fiber optic termination would have to be made on location. In the third situation a substantial pumping restriction may be incurred.

Given that safety is a primary concern, and that there is considerable investment in existing equipment, including oilfield tubulars such as coiled tubing strings, it would be an advance in the art if optical fiber-enabled tubulars could be modified to increase safety and efficiency during the processes of making and using of the optical fiber-enabled tubulars. This invention offers methods and apparatus for these purposes. The American Petroleum Institute (API) requires that downhole tools be equipped with two barriers that independently prevent fluid from flowing back to surface through the coiled tubing. In the present invention these barriers may take the form of compression fittings and other fittings associated with the optical fiber terminations. If well fluids or well treatment fluids start to move uphole due to a failure of a component, the compression fittings and other fittings described herein will prevent uphole flow from exiting the well.

Referring now to the figures, FIG. 1 illustrates schematically and not to scale a cross-sectional view of an apparatus 100 of the invention. FIG. 1 illustrates an oilfield tubular 2, which is not a part of the invention, and which may be a piece of coiled tubing, section of pipe, and the like, having an end connection 4. An optical fiber carrier conduit or tube 6, which may be straight or flexible as illustrated, routes one or more optical fibers 12 through oilfield tubular 2. Apparatus 100 includes a body 8 that has a diameter smaller than the internal diameter of oilfield tubular 2. Body 8 has a first end 9 which is an optical fiber termination end, and a second end 10, which sealingly connects body 8 to optical fiber carrier 6. Optical fiber 12 may have slack, which may be wound around a fiber optic termination support rod 14 for a portion of its length. Body 8 also may comprise a bare fiber optic bulkhead 16 which functions to seal off fiber carrier 6 from well bore and treatment fluids. Apparatus 100 may thus be used to terminate a fiber carrier 6 in an oilfield tubular, and fiber optics 12 contained inside fiber carrier 6. Fiber carrier 6 may be mechanically held and sealed by a compression style fitting at end 10, as is better illustrated in the more specific embodiments discussed in reference to FIGS. 7-10. Apparatus 100 may be described in certain embodiments as a cartridge that holds and protects fiber optic terminations made in the yard or on location.

Figure 2:
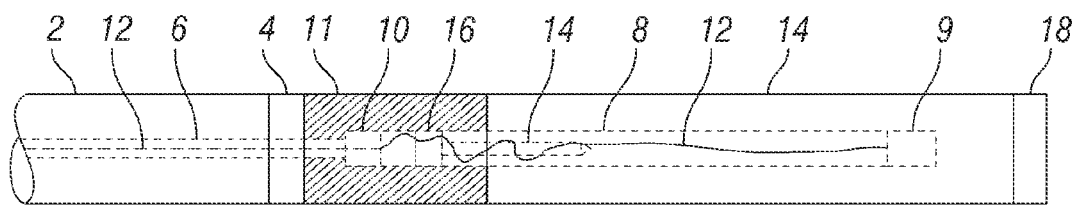
FIG. 2 is a schematic cross-sectional view of the apparatus of FIG. 1 having an installed stabbing head.
Figure 3:
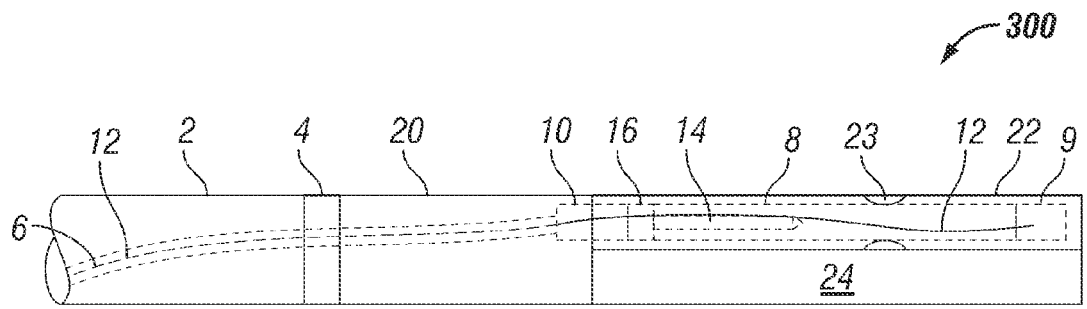
FIG. 3 is a schematic cross-sectional view of the apparatus of claim 1 installed in a bottom hole assembly.

Referring now to FIGS. 2 and 3, embodiment 200 includes the same features as embodiment 100 of FIG. 1 with the addition of a stabbing head 17 having an end 18. The same numerals are used throughout the drawing figures for the same parts unless otherwise indicated. Stabbing head 17 is employed to hold body 8 while oilfield tubular 2 is being stabbed and un-stabbed from a coiled tubing injector head (not shown) or other equipment, such as a lubricator, blowout preventer, wellhead, and the like. Stabbing head end 18 may have a feature allowing embodiment 200 to be pulled through or removed from such equipment. In the case of coiled tubing, once the coiled tubing is installed in the injector, stabbing head 17 may be removed and a fiber optic-enabled coiled tubing head 22 may be installed (as seen in embodiment 300 of FIG. 3). Coiled tubing head 22 is designed to hold body or cartridge 8 and fiber optic terminations 9 in an environmentally sealed chamber, while also providing a fluid flow path 24. A connector 20 may be provided between oilfield tubular 2 and coiled tubing head 22 to provide an off center connection for end 10 of body 8. Body 8 may also be steadied by a stabilizer 23.

Figure 5:
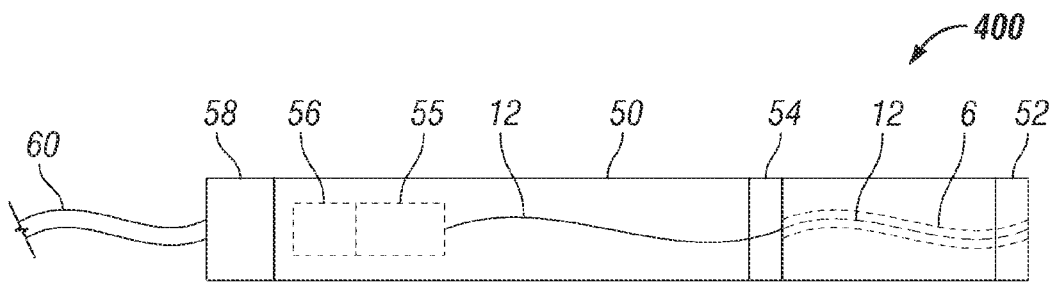
FIG. 5 is a schematic cross-sectional view of an apparatus of the invention installed in a pressure bulkhead in accordance with the present invention.

The bare fiber optic bulkhead 16 is an important aspect of the inventive cartridge design and may be utilized for a variety of purposes. A specially machined plug or mechanical part can be used to pass bare fiber through as a bulkhead and maintain pressure integrity. The plug or part allows the user to minimize fiber optic terminations by allowing the bare fiber to pass through the bulkhead rather than having to make a fiber optic termination to get the fiber through the bulkhead. The reduction in fiber optic terminations reduces the loss of the system and is very important when the fiber becomes very long. A bare fiber optic bulkhead may also be employed in a pressure bulkhead. A bare fiber optic bulkhead could be applied with any pressure application being a possibility both on surface and down hole. A generic pressure bulkhead is described in reference to embodiment 400 of FIG. 5, which includes a body 50 having a connection 52 to an oilfield tubular (not shown). Another connection 54 secures fiber optic 12 and allows it to pass through body 50 to a fiber optic termination 55, which is in turn connected to an electrical or optical connection 56. Connection 56 may be a component of a surface electronics connection 58 having a lead or leads in a cable 60.

In a fiber optic-enabled coiled tubing string a fiber carrier protective tube 6 may carry any number of fibers, with the current standard being 4 fibers. The fibers may differentially marked, such as color coded, for easy identification on either end of the coiled tubing string, which can range from 2,000 to over 30,000 ft in length. In some embodiments each fiber may have a dedicated purpose, which makes it desirable to have the differential marking to know where the fiber needs to be connected on the surface end and on the downhole end. It should be understood that in addition to color coding, the differential marking can be accomplished by marking with lines, letters, numbers, or the like.

Figure 6:
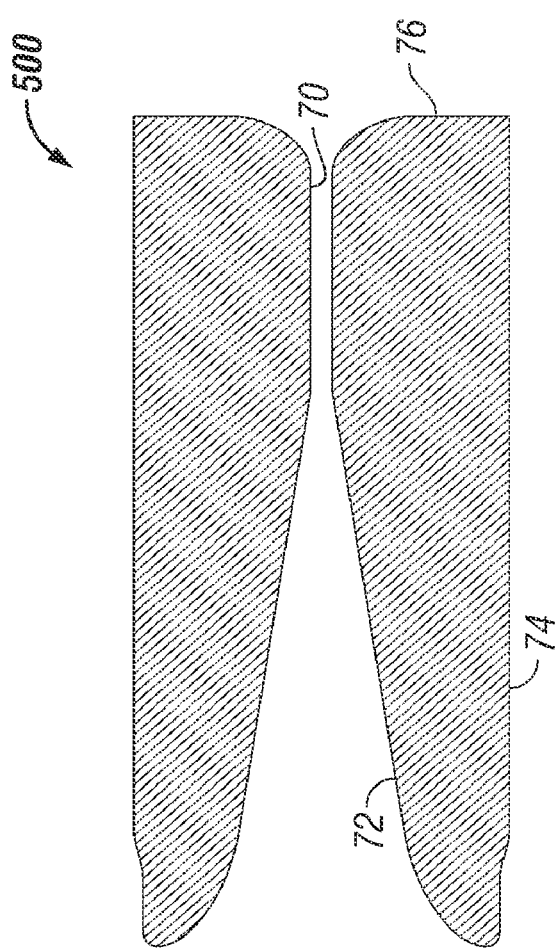
FIG. 6 is a schematic cross-sectional view of a fiber optic ferrule useful in certain methods of the invention.

To form a fiber optic termination, an end of an optical fiber is bonded to a component called a ferrule. One component needed to make fiber optic terminations is the bonding mechanism, which may be a mechanical bond, a chemical bond, or combination thereof. Suitable mechanical bonds include compression bonds, and the like. The ferrule itself may have a geometry contributing to the mechanical nature of the bond. One exemplary ferrule embodiment useable in methods of making fiber optic terminations is illustrated schematically in FIG. 6, illustrating a ferrule having a narrow passage 70. An optical fiber may be guided into passage 70 through a smooth taper passage 72, which gradually changes from a wide opening to a narrow opening. Smooth taper passage 72 aids in installing the fiber into the ferrule so that the fiber is not broken by landing on a ferrule shoulder. Other features of ferrule embodiment 500 include the provision of relatively smooth and straight walls 74 that aid in installation of the ferrule into a fiber optic connection, as well as shoulders 76 that aid in axially securing the ferrule, for example when the ferrule abuts against a surface. One exemplary fiber optic ferrule has a 126 µm passage 70, and includes a seal ring allowing pressure integrity to be maintained. Exemplary ferrules are also very small in size and can be placed in a block at bottom hole assembly connections or at surface to make quick stab tool joints. The ferrule depicted in FIG. 6 has a flat polished surface 76, but there is no reason surface 76 could not be angle polished as well.

Suitable chemical bonds may be made by any number of chemistries and employing any number of dispensing means for dispensing chemical bonding precursors which will form a usable bond when cured. In this sense "usable bond" means a bond that withstands, at least temporarily for the time required, temperature, pressure, stress and chemical environment expected in the use of the bond. Chemical bonds may be used in conjunction with ferrules of the type illustrated in FIG. 6, wherein polymeric precursors may be injected into the passage 72 either before, after, or before and after the optical fiber is positioned in the ferrule. Suitable chemical bonds that may be used include those formed from heat curable resins, radiation curable resins, moisture curable resins, and room temperature curable resins. The resin itself may be selected from those forming carbon chain polymers, heteroatom chain polymers, polymer networks, and combinations thereof.

Condensation curable and addition polymerizable resins, wherein the addition polymerizable resins are derived from a polymer precursor which polymerizes upon exposure to an energy source which aids in the initiation of the polymerization or curing process may be suitable. Examples of non-thermal energy sources include electron beam, ultraviolet light, visible light, and other non-thermal radiation. During this polymerization process, the resin is polymerized and the polymer precursor is converted into a solidified polymer. Upon solidification of the polymer precursor, the bond is formed. The polymer forming the bond is also generally responsible for adhering itself to the optical fiber and the ferrule, however the invention is not so limited. Addition polymerizable resins are readily cured by exposure to radiation energy. Addition polymerizable resins can polymerize through a cationic mechanism or a free radical mechanism. Depending upon the energy source that is utilized and the polymer precursor chemistry, a curing agent, initiator, or catalyst may be used to help initiate the polymerization.

Examples of useful organic resins to form these classes of chemical bonds include methylol-containing resins such as phenolic resins, urea-formaldehyde resins, and melamine formaldehyde resins; acrylated urethanes; acrylated epoxies; ethylenically unsaturated compounds; aminoplast derivatives having pendant unsaturated carbonyl groups; isocyanurate derivatives having at least one pendant acrylate group; isocyanate derivatives having at least one pendant acrylate group; vinyl ethers; epoxy resins; and mixtures and combinations thereof. The term "acrylate" encompasses acrylates and methacrylates.

Phenolic resins are widely used in industry because of their thermal properties, availability, and cost. There are two types of phenolic resins, resole and novolac. Resole phenolic resins have a molar ratio of formaldehyde to phenol of greater than or equal to one to one, typically between 1.5:1.0 to 3.0:1.0. Novolac resins have a molar ratio of formaldehyde to phenol of less than one to one. Examples of commercially available phenolic resins include those known by the tradenames "Durez" and "Varcum" from Durez Corporation, a subsidiary of Sumitomo Bakelite Co., Ltd.; "Resinox" from Monsanto; "Aerofene" from Ashland Chemical Co. and "Aerotap" from Ashland Chemical Co.

Acrylated urethanes are diacrylate esters of hydroxy-terminated, isocyanate (NCO) extended polyesters or polyethers. Examples of commercially available acrylated urethanes include those known under the trade designations "UVITHANE 782", available from Morton Thiokol Chemical, and "CMD 6600", "CMD 8400", and "CMD 8805", available from Radcure Specialties.

Acrylated epoxies are diacrylate esters of epoxy resins, such as the diacrylate esters of Bisphenol A epoxy resin. Examples of commercially available acrylated epoxies include those known under the trade designations "CMD 3500", "CMD 3600", and "CMD 3700", available from Radcure Specialties.

Ethylenically unsaturated resins include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically unsaturated compounds may have a molecular weight of less than about 4,000 and may be esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyloxyethyl)isocyanurate, 1,3,5-tri(2-methyacryloxyethyl)-triazine, acrylamide, methylacrylamide, N-methylacrylamide, N,N-dimethylacrylamide, N-vinylpyrrolidone, and N-vinylpiperidone.

Aminoplast resins have at least one pendant α,β-unsaturated carbonyl group per molecule or oligomer. These unsaturated carbonyl groups can be acrylate, methacrylate, or acrylamide type groups. Examples of such materials include N-(hydroxymethyl) acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 both incorporated herein by reference.

Isocyanurate derivatives having at least one pendant acrylate group and isocyanate derivatives having at least one pendant acrylate group are further described in U.S. Pat. No. 4,652,274 incorporated herein after by reference. The isocyanurate material may be a triacrylate of tris(hydroxy ethyl) isocyanurate.

Epoxy resins have an oxirane and are polymerized by the ring opening. One class of exemplary epoxy precursors are those cured using ultraviolet light. The use of ultraviolet light-curable resins enables the fiber optic termination processes of the invention to be performed on location. Most thermally curable epoxies must be cured at temperatures greater than 300F, which is very difficult to do on an oilfield location. Useable epoxide resins include monomeric epoxy resins and oligomeric epoxy resins. Examples of some useful epoxy resins include 2,2-bis[4-(2,3-epoxypropoxy)-phenyl propane] (diglycidyl ether of Bisphenol) and commercially available materials under the trade designations "Epon 828", "Epon 1004", and "Epon 1001F" available from Shell Chemical Co., Houston, Tex., "DER-331", "DER-332", and "DER-334" available from Dow Chemical Co., Freeport, Tex. Other suitable epoxy resins include glycidyl ethers of phenol formaldehyde novolac (e.g., "DEN-431" and "DEN-428" available from Dow Chemical Co.).

Epoxy resins useful in the invention may polymerize via radiation and a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other cationic curing agents include a salt having an organometallic complex cation and a halogen containing complex anion of a metal or metalloid which are further described in U.S. Pat. No. 4,751,138 incorporated here in after by reference (column 6, line 65 to column 9, line 45). Another example is an organometallic salt and an onium salt is described in U.S. Pat. No. 4,985,340 (column 4, line 65 to column 14, line 50); and European Patent Application Nos. 306,161 and 306,162, both published Mar. 8, 1989, all incorporated by reference. Still other cationic curing agents include an ionic salt of an organometallic complex in which the metal is selected from the elements of Periodic Group IVB, VB, VIB, VIIB and VIIIB which is described in European Patent Application No. 109,581, published Nov. 21, 1983, incorporated by reference.

Regarding free radical curable resins, in some embodiments the polymeric precursor solution may further comprise a free radical curing agent. However in the case of an electron beam energy source, the curing agent is not always required because the electron beam itself generates free radicals. Examples of free radical thermal initiators include peroxides, e.g., benzoyl peroxide, azo compounds, benzophenones, and quinones. For either ultraviolet or visible light energy source, this curing agent is sometimes referred to as a photoinitiator. Examples of initiators, that when exposed to ultraviolet light generate a free radical source, include but are not limited to those selected from organic peroxides, azo compounds, quinones, benzophenones, nitroso compounds, acryl halides, hydrozones, mercapto compounds, pyrylium compounds, triacrylimdazoles, bisimidazoles, chloroalkytriazines, benzoin ethers, benzil ketals, thioxanthones, and acetophenone derivatives, and mixtures thereof. Examples of initiators that when exposed to visible radiation generate a free radical source can be found in U.S. Pat. No. 4,735,632, incorporated herein by reference. The initiator for use with visible light may be that known under the trade designation "Irgacure 369" commercially available from Ciba Specialty Chemicals, Tarrytown, N.Y.

Figure 4:
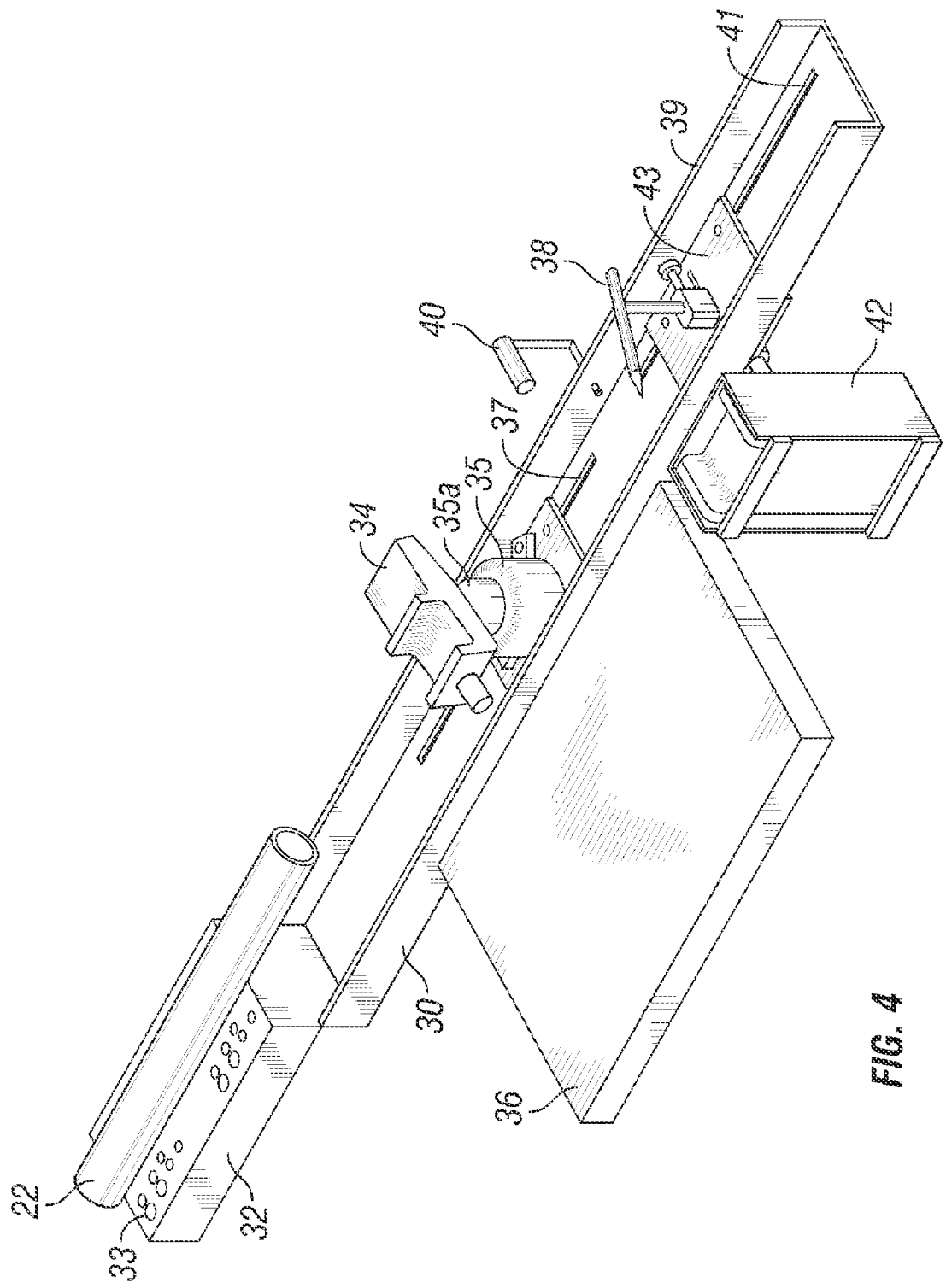
FIG. 4 is a schematic perspective view of an assembly useful in certain methods of terminating optical fibers in accordance with the invention.

The fiber optic termination processes of the invention may comprise a combination of repeatable steps and off the shelf components. In certain embodiments the fiber optic termination processes employ tools geared toward removing user variation and designed with repeatability of the process in mind. One exemplary assembly fixture that may be used to make a fiber optic termination is presented in perspective view of FIG. 4. Assembly fixture 30 may be used to make the termination process reliable and repeatable by removing user variability. Assembly fixture 30 may be attached to any size oilfield tubular and to a pressure bulkhead. Assembly fixture 30 as illustrated is but one exemplary example of a useable assembly fixture, and other designs will be readily apparent to the skilled artisan. The embodiment depicted in FIG. 4 includes a support 32 having a series of holes 33 for clamping or otherwise securing a coiled tubing head 22 therein. Coiled tubing head 22 may have at least one exposed optical fiber (not shown) requiring a downhole termination. Alternatively, coiled tubing head 22 may be replaced by a pressure bulkhead including an optical fiber requiring a surface termination. Coiled tubing head 22 may also be replaced by just coiled tubing equipped with fiber. Assembly fixture 30 includes a vise 38 for holding a fiber optic ferrule while the cure epoxy and the fiber are being inserted into the ferrule. Vise 38 may include a movable mount 43 in a tray 39, whereby vise 38 may be movable inline with coiled tubing head 22 by virtue of a track 41. A second vise 34 may also be mounted to hold mechanical parts from the cartridge apparatus or other down hole components explained earlier. Second vise 34 may include a movable mount 35 in tray 39, whereby second vise 34 may be movable inline with the coiled tubing by virtue of a track 37. Mount 35 may include a ball joint connection 35a that allows further freedom of movement of vise 34. A tool tray 36 may be held by the fixture to allow easy access to some or all tools needed to terminate the fiber and build a fiber optic-enabled coiled tubing head or optical fiber-enabled pressure bulkhead. Radiation means (not shown) may be provided, to cure the resin inside the fiber optic termination. An automatic polisher may be held or attached to the fixture, although polishing may be done by hand. Once a connection is completed a holder 40 located on the side of assembly fixture 30 may be provided to hold the terminated fiber optic ferrules while other terminations and assembly are being performed. An OTDR 42 may be held by the fixture to check the quality/loss of the fiber optic termination.

The coiled tubing head 22 is a down hole method for holding an optical fiber carrier 6 and the terminated fibers. Coiled tubing head 22 functions to protect the optical fibers from downhole pressures and fluids. Coiled tubing heads may be designed in such a way that the fiber optic terminations can hold pressure and a bulkhead may be employed at the tool joint to keep the bottom hole assembly from flooding should fiber carrier 6 or coiled tubing head 22 fail. As with the coiled tubing head, the bottom hole assembly may have a bulkhead at the tool joint, which protects the fiber and the coiled tubing head should the bottom hole assembly fail and fill with wellbore/treatment fluid. One method of securing a fiber carrier 6 to a coiled tubing head 22 is with a compression style fitting. This fitting is used to transmit the tensile load and to seal the coiled tubing head from wellbore fluid and pressure. It is by no means the only way to secure a fiber carrier as an o-ring seal and collet could just as easily be used. A coiled tubing head is depicted generically in FIG. 5, while a specific embodiment is illustrated in FIGS. 9A and 9B, described herein below.

Figure 10:
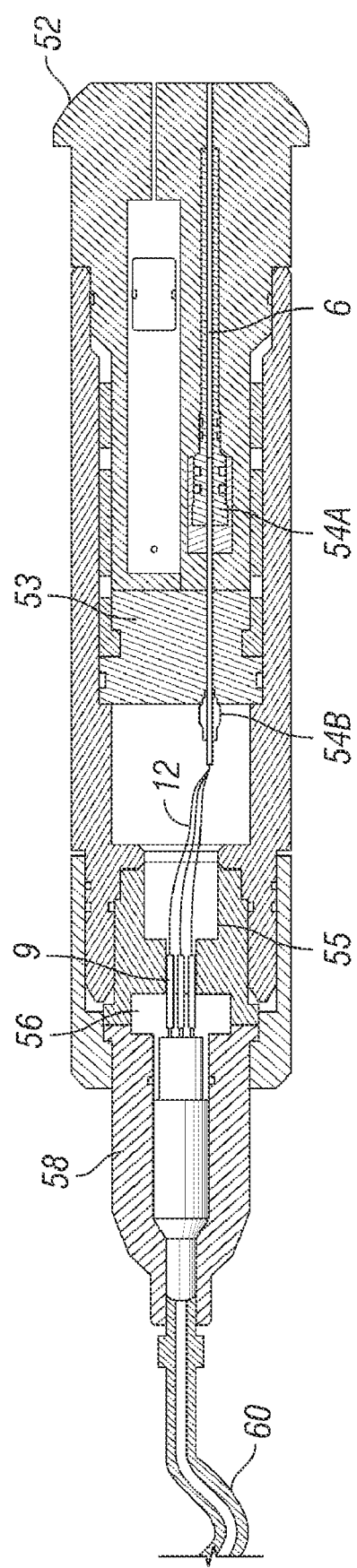
FIG. 10 is a schematic cross-sectional view of the apparatus of FIG. 7 installed in a pressure bulkhead.

A pressure bulkhead may be used on the surface to protect the optical fiber and terminations from fluid and pressures, while also securing the optical fiber carrier to keep it from being pumped downhole. The pressure bulkhead may secure the fiber carrier by means of a collet and a compression fitting. There are then two pressure barriers that protect surface equipment in the event of a failure, the compression fitting and the fiber optic ferrules. A generic pressure bulkhead was discussed in reference to FIG. 5, while a more specific version is illustrated in FIG. 10.

Figure 7:
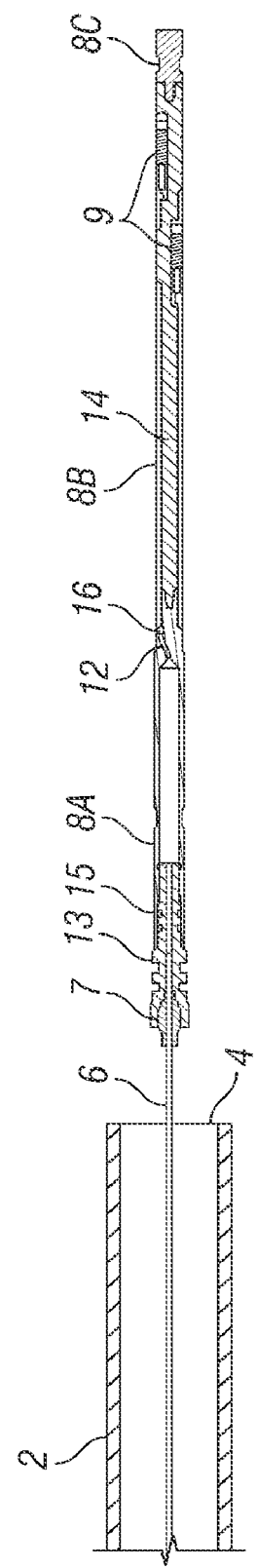
FIG. 7 is a schematic cross-sectional view of one embodiment of an apparatus of the invention.

While FIGS. 1-3 and 5 presented generic illustrations of apparatus of the invention used with oilfield tubulars, FIGS. 7-11 present more specific examples of apparatus and methods of the invention used with coiled tubing. FIG. 7 illustrates schematically and not to scale a cross-sectional view of an apparatus of the invention. FIG. 7 illustrates a coiled tubing 2, which is not a part of the invention, having an end region 4. An optical fiber carrier conduit or tube 6, which may be straight as illustrated, routes one or more optical fibers 12 through coiled tubing 2. The apparatus of FIG. 7 includes a body having three sub-sections 8A, 8B, and 8C as illustrated, all sub-sections having a diameter smaller than the internal diameter of coiled tubing 2. Optical fiber termination end 9 is illustrated having two optical fiber terminations, while a second end includes a bulkhead seal 15, a cartridge seal 13, and a mechanical hold and seal 7, which in this embodiment is a compression style fitting. This series of seals 7, 13, and 15 sealingly connects body sub-section 8A to optical fiber carrier 6. Optical fiber 12 may have slack, which may be wound around a fiber optic termination support rod 14 for a portion of its length. A bare fiber optic bulkhead 16 is provided near the junction of body components 8A and 8B which functions to seal off fiber carrier 6 from well bore and treatment fluids in the event that the CT head or BHA has a failure.

FIGS. 8A and 8B are cross-sectional views of the apparatus of FIG. 7 having an installed stabbing head 17 along with a connector 11. End 18 includes a through hole 18A for use in pulling the stabbing head and terminated fiber optic-enabled coiled tubing through a coiled tubing injector head (not shown). The remaining features were previously discussed in reference to FIG. 7.

FIGS. 9A and 9B are cross-sectional views of the apparatus of FIG. 7 installed in a coiled tubing head 22. A series of connectors 20A, 20B and 22 may be employed as illustrated. Connector 20B may be a threaded collar. The remaining features have already been described. Note that a fluid flow path is provided through coiled tubing 2, connectors 20A, 20B, and 22, and through coiled tubing head 22 at 24. Item 25 is a protector and could be replaced with a variety of components.

FIG. 10 is a schematic cross-sectional view of the apparatus of FIG. 7 installed in a pressure bulkhead, illustrating a fiber carrier 6 carrying four optical fibers 12, and four fiber optic terminations 9. A collet 54A holds fiber carrier 6 as it emerges from a connector 52. A pressure bulkhead 53 is depicted, including a pressure seal 54B. Pressure seals 55 are also maintained at fiber optic terminations 9. A set of four mating electronic or optical connections are illustrated at 56, which are included in a connector 58. Connector 58 in turn connects with a cable 60 which is attached to local or remote data processing equipment, such as a computer or data logging system.

An optional feature of apparatus of the invention is one or more sensors located at the coiled tubing head to detect the presence of hydrocarbons (or other chemicals of interest) in fluid attempting to traverse up the coiled tubing main passage during a reverse flow procedure. The chemical indicator may communicate its signal to the surface over a fiber optic line terminated as herein described, or by wire line, wireless transmission, and the like. When a certain chemical is detected that would present a safety hazard if allowed to reach surface (such as oil or gas), a signal may be sent over another optical fiber terminated as described herein, to an actuator to return the reversing system to its safe position long before the chemical creates a problem.

Typical uses of apparatus and methods of the invention include deploying a fiber optic tether into a coiled tubing string, the coiled tubing deployed into a wellbore, and one or more optical fibers used to transmit control signals from a surface control system over the fiber optic tether to borehole equipment connected to the coiled tubing. Another use might be to transmit information from borehole equipment to the surface control system over the fiber optic tether. Yet another use might be to transmit a property measured by the fiber optic tether to the surface control system via the fiber optic tether. In some instances the fiber optic tether may be used in performing an operation downhole, where the operation is controlled by signals transmitted over the fiber optic tether. Such operations may include for example activating valves, setting tools, activating firing heads or perforating guns, activating tools, and reversing valves.

Figure 11:
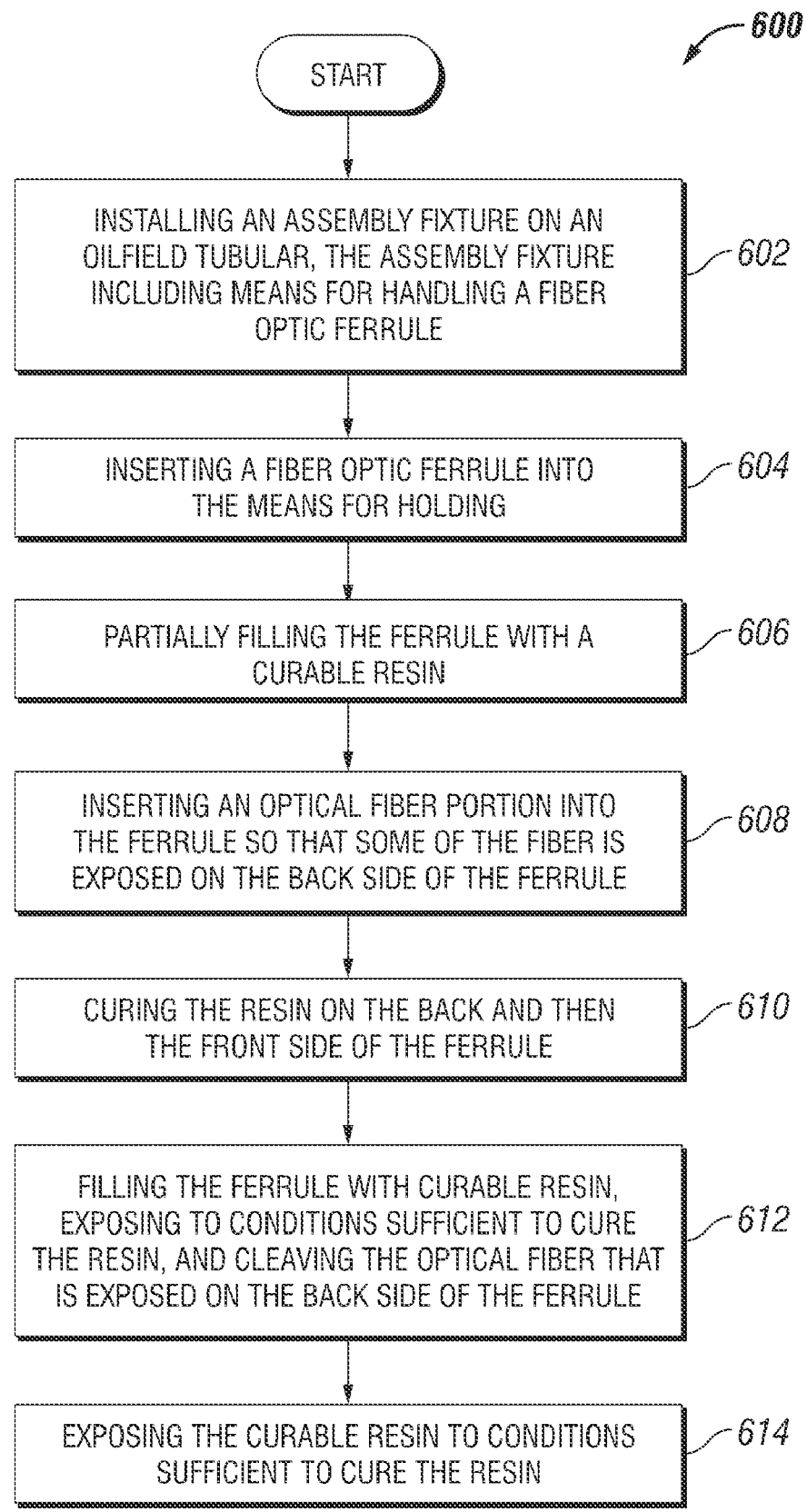
FIG. 11 is a flowchart illustrating one non-limiting method of the invention.

FIG. 11 is a flowchart illustrating one non-limiting method of making a fiber optic termination of the invention 600. First, an assembly fixture may be installed on an oilfield tubular, the assembly fixture including means for holding a fiber optic ferrule 602, such as a clamp or vise. If making connections on the coiled tubing end make sure that the coiled tubing head or other means of securing the fiber carrier to the coiled tubing is installed. Place the OTDR in the holder. Insert a fiber optic ferrule into the vise 604, and partially fill the ferrule with a radiation curable polymer 606, such as an epoxy. Insert the fiber into the front side of the ferrule so that some of the fiber is exposed on the back side of the ferrule 608. Cure the epoxy on the back side of the ferrule and then cure the epoxy on the front side of the ferrule 610. Fill the rest of the ferrule with epoxy, and cure again. The ferrule is then inserted into a cleaving tool, being careful not to break the fiber, then the fiber is cleaved 612. Cure the front of the ferrule 614. Polish the fiber by hand or by machine with machine being the preferred method.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. An apparatus comprising:
   (a) an oilfield tubular;
   (b) a conduit disposed through said oilfield tubular for carrying an optical fiber; and
   (c) a body for positioning in a well downhole of said oilfield tubular, said body sealably engaged to said conduit and to accommodate a termination of the optical fiber, said oilfield tubular having a diameter greater than that of said body, wherein said body is configured for fitting within a removable stabbing connection.

2. The apparatus of claim 1 wherein the oilfield tubular is coiled tubing.

3. The apparatus of claim 1 wherein said body further comprises a bare fiber optic bulkhead to seal off a portion of said conduit from an environment of the well.

4. The apparatus of claim 3 wherein the bare fiber optic bulkhead comprises means for allowing the apparatus to be used in a hard wired disconnect.

5. The apparatus of claim 3 wherein said bare fiber optic bulkhead is a pressure bulkhead.

6. The apparatus of claim 1 wherein said body is acid and organic solvent compatible, and constructed to survive solids up to 2 ppa sand.

7. The apparatus of claim 1 further comprising an anchoring connection to secure said conduit within said body, said conduit configured to disconnect from said anchoring connection when a predetermined tensile stress is applied to said anchoring connection.

8. The apparatus of claim 1 further comprising a compression seal disposed within said body.

9. The apparatus of claim 1 further comprising a fiber-optic enabled tool communicatively coupled to the optical fiber.

10. An apparatus comprising:
    an oilfield tubular;
    a conduit disposed through said oilfield tubular for carrying an optical fiber;
    a body for positioning in a well downhole of said oilfield tubular, said body sealably engaged to said conduit and to accommodate a termination of the optical fiber, said oilfield tubular having a diameter greater than that of said body, and an internal concentric rod for positioning within said body, said internal concentric rod to accommodate excess optical fiber slack thereabout during stabbing and un-stabbing operations.

11. An apparatus comprising:

an oilfield tubular;

a conduit disposed through said oilfield tubular for carrying an optical fiber;

a body for positioning in a well downhole of said oilfield tubular, said body sealably engaged to said conduit and to accommodate a termination of the optical fiber, said oilfield tubular having a diameter greater than that of said body, and a stabbing head for positioning about said body.

* * * * *